US012296962B2

(12) United States Patent
Pence

(10) Patent No.: US 12,296,962 B2
(45) Date of Patent: May 13, 2025

(54) MEAL TABLE FOR OBLIQUE SEAT INSTALLATIONS AND OBLIQUE SEATING ARRANGEMENTS

(71) Applicant: B/E Aerospace, Inc., Winston-Salem, NC (US)

(72) Inventor: Tracy N. Pence, King, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 217 days.

(21) Appl. No.: 18/081,883

(22) Filed: Dec. 15, 2022

(65) Prior Publication Data
US 2024/0199214 A1    Jun. 20, 2024

(51) Int. Cl.
B64D 11/06    (2006.01)

(52) U.S. Cl.
CPC ...... B64D 11/0638 (2014.12); B64D 11/0601 (2014.12)

(58) Field of Classification Search
CPC ............ B64D 11/0638; B64D 11/0601; B64D 11/0605
USPC ........................................................ 297/145
See application file for complete search history.

(56) References Cited

U.S. PATENT DOCUMENTS

| | | | |
|---|---|---|---|
| 5,547,247 A * | 8/1996 | Dixon | A47C 7/70 297/145 |
| 5,683,136 A | 11/1997 | Baumann et al. | |
| 8,474,384 B2 * | 7/2013 | Sundarrao | A47B 5/006 108/42 |
| 8,528,968 B2 | 9/2013 | Moulton et al. | |
| 9,382,007 B2 | 7/2016 | Ersan et al. | |
| 10,023,315 B2 | 7/2018 | Kuyper et al. | |
| 10,322,807 B2 | 6/2019 | Moulton et al. | |
| 11,465,749 B1 | 10/2022 | Lawson | |
| 2010/0319588 A1 | 12/2010 | Hanna et al. | |
| 2017/0021932 A1 | 1/2017 | Marais | |
| 2021/0289943 A1 * | 9/2021 | Walker | A47B 83/02 |
| 2021/0316866 A1 | 10/2021 | Carlioz et al. | |
| 2022/0332425 A1 | 10/2022 | Jérôme et al. | |

FOREIGN PATENT DOCUMENTS

| | | |
|---|---|---|
| CN | 103687752 A | 3/2014 |
| EP | 2289798 A2 | 3/2011 |
| EP | 3712067 A1 | 9/2020 |

OTHER PUBLICATIONS

European Patent Office, Extended European Search Report received in EP Application No. 23217136.3, May 10, 2024, 8 pages.

* cited by examiner

*Primary Examiner* — Milton Nelson, Jr.
(74) *Attorney, Agent, or Firm* — Suiter Swantz IP

(57) ABSTRACT

A meal table assembly readily adaptable for use with various oblique seat installations. The meal table assembly installs on a seat-side console, stows openly against a fuselage wall or aircraft centerline, rotates to a deployed position, and further deploys to an expanded condition. In embodiments, the meal table is bi-fold and includes at least one of vertical and fore/aft adjustment. The meal table assembly according to the present disclosure provides a large usable table size, usability when stowed, reduced weight/cost, increased rigidity, less design variation within the overall seating platform, and ability to stow partially for increased ingress/egress clearance.

16 Claims, 8 Drawing Sheets

MEAL TABLE FOR OBLIQUE SEAT INSTALLATIONS AND OBLIQUE SEATING ARRANGEMENTS

TECHNICAL FIELD AND BACKGROUND

The present disclosure relates generally to meal table solutions for aircraft passenger seats, and more particularly to a meal table readily adaptable to different oblique seat installations by modifying a single table dimension, wherein the table is configured to stow openly against a sidewall, deploy by rotating, and further deploy by folding and/or sliding along a seat centerline.

Aircraft passenger seats may be categorized according to their installation angle relative to the aircraft longitudinal axis. For example, passenger seats angled between 0 degrees and 18 degrees may be categorized as forward facing, passenger seats angled between 18 degrees and 45 degrees may be categorized as oblique, and passenger seats angled between 80 degrees and 100 degrees may be categorized as side facing. Seat certification criteria may be different for each seat category.

Oblique passenger seats may be preferred in some premium seating arrangements in order to maximize both seat density and passenger privacy. For example, oblique seats provide the ability to nest seats and associated seat furniture, longitudinally stagger seats, shift seats away from shared aisles, face seats away from shared aisles, face adjacent passengers in different directions, etc.

Based on size, shape, and aisle differences, each different aircraft may require a unique nesting solution for oblique passenger seats. For example, nesting solutions may differ in terms of seat pitch, seat angle, lateral spacing, privacy dividers, furniture sharing, furniture overlap, amenity locations, amenity configurations, etc. While it may be necessary to provide unique solutions for certain seat elements for each different aircraft, it would be cost effective and beneficial to provide at least some seat elements that have generally universal application.

One such element is the meal table. Known to those skilled in the art, meal tables are typically used during flight for dining and working, and stow between uses of the meal table and in preparation for takeoff and landing. In the case of oblique passenger seats, conventional meal tables may stow within consoles, armrests, and footwells. Armrest and console stowage solutions typically require complex hinges capable of sequential motions along different rotational axes. Footwell stowage solutions typically require motion controllers capable of translation and elevate changes, sometimes simultaneously. Such conventional meal table solutions require dedicated space to stow the meal table within another seat element. For example, stowing the meal table within an armrest or console requires an oversized armrest or console, while stowing the meal table within a footwell decreases the amount of space available for use in the footwell by the passenger. In addition, conventional meal tables are not available for use when fully stowed.

Accordingly, what is a needed is a meal table solution that overcomes the disadvantages of prior art meal tables, and which is readily adaptable to different oblique seating arrangements.

BRIEF SUMMARY

According to a first aspect, the present disclosure provides a seating arrangement for an aircraft passenger cabin. The seating arrangement includes a passenger seat positioned in the aircraft passenger cabin at an oblique angle relative to the aircraft longitudinal axis, a console positioned to one side of the passenger seat, the console tapering in a direction of a forward end of the console, a footwell positioned forward of the passenger seat and spaced apart from the forward end of the console, and a meal table assembly including a support arm and a meal table attached to the support arm. Regarding the meal table assembly, the support arm is pivotally attached to the console proximate the forward end of the console, the support arm extends from the console, and the support arm is configured to rotate the meal table between a stowed position of the meal table in which a first portion of the meal table is positioned within the footwell and a second portion of the meal table is positioned between the footwell and the forward end of the console, and a deployed position of the meal table in which each of the first and second portions of the meal table are positioned outside of the footwell.

In some embodiments, the console is positioned along a fuselage wall of the aircraft cabin, and in the stowed position of the meal table, a first lateral side of the meal table is positioned against the fuselage wall of the aircraft cabin.

In some embodiments, the console is not attached to or shared with any other passenger seat positioned in the aircraft cabin.

In some embodiments, the meal table is a bi-fold table including a first table hinged to a second table, in the stowed position of the meal table the first and second tables are positioned vertically adjacent, in the deployed position of the meal table the first and second tables are positioned vertically adjacent, and in an expanded condition of the meal table the first and second tables are positioned horizontally adjacent.

In some embodiments, each of the first and second tables includes a beverage holder, the beverage holder of the first table is available for use only when the meal table is positioned in the stowed or deployed positions of the meal table, and the beverage holder of the second table is available for use only when the meal table is in the expanded condition of the meal table.

In some embodiments, the support arm includes a first portion and a second portion, the first portion is pivotally attached to the console, and the second portion is angled relative to the first portion.

In some embodiments, changing a length of the first portion repositions the second portion relative to a vertical pivot axis of the meal table.

In some embodiments, when in the deployed position of the meal table or the expanded condition of the meal table, the meal table is slidable fore and aft relative to the support arm to reposition the meal table relative to the passenger seat.

In some embodiments, when in the deployed position of the meal table or the expanded condition of the meal table, the support arm is repositionable along a vertical guide rail to adjust a vertical position of the meal table.

According to a second aspect, the present disclosure provides a meal table assembly for installation in a seating arrangement including an oblique passenger seat. The assembly includes a console having a forward end, a support arm pivotally attached to the console proximate the forward end and the support arm extending from the console, and a meal table attached to the support arm. The support arm is configured to rotate the meal table between a stowed position of the meal table in which the meal table is positioned forward of the forward end, and a deployed position of the meal table in which the meal table is positioned to one side of the console.

This summary is provided solely as an introduction to subject matter that is fully described and shown in the detailed description and drawings. This summary should not be considered to describe essential features nor be used to determine the scope of the claims. Moreover, it is to be understood that both the foregoing summary and the following description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION OF THE INVENTION

Figure 1:
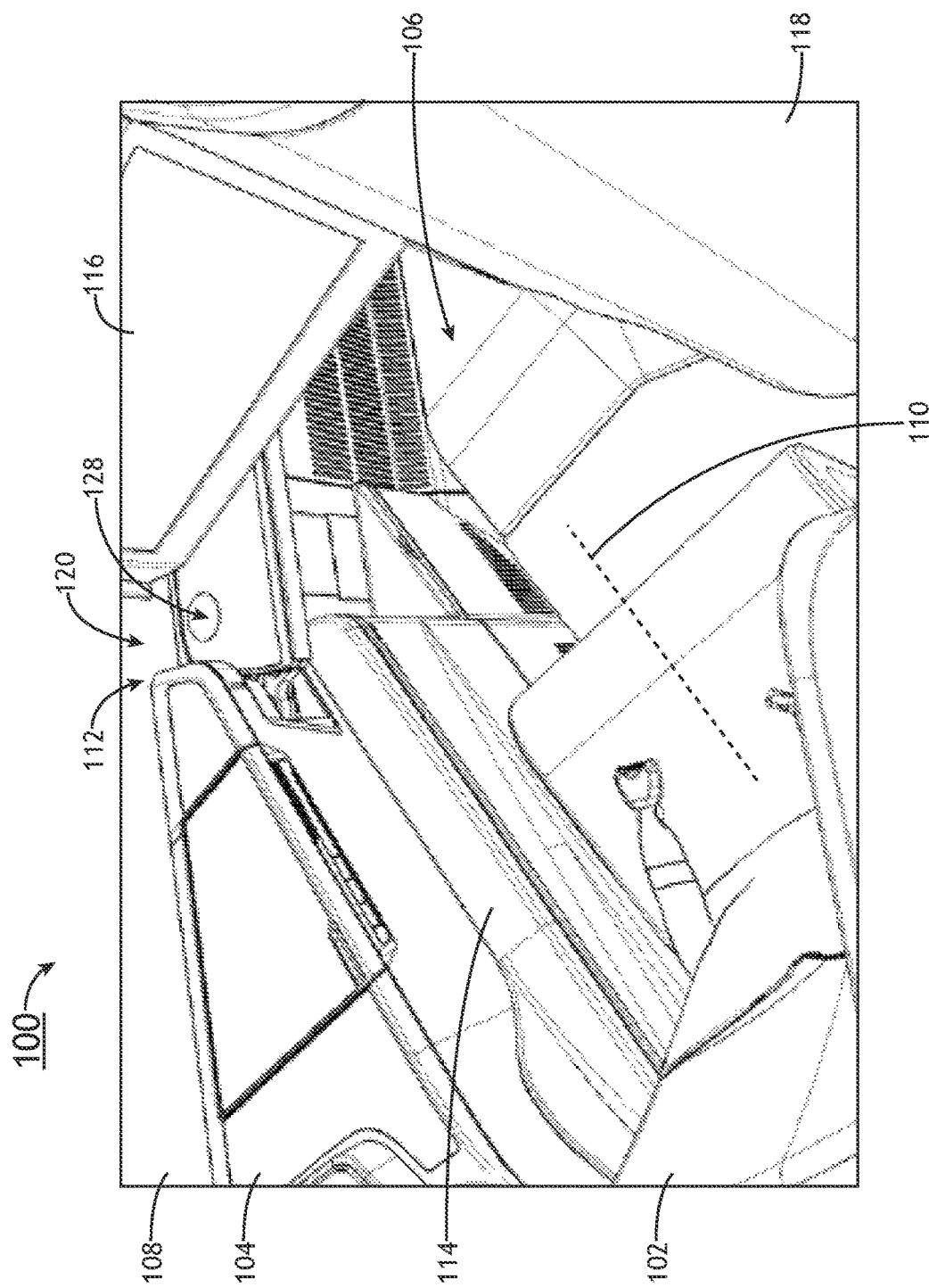
FIG. 1 is a perspective view of a passenger seating arrangement according to an embodiment of the present disclosure, showing a meal table in a stowed position.

Reference will now be made in detail to the subject matter disclosed, which is illustrated in the accompanying drawings.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

Broadly, the present disclosure provides a meal table solution for oblique passenger seating arrangements for aircraft cabins and other installation environments. The meal table solution described herein is readily adaptable to different oblique seating arrangements as may be required for different aircraft. For example, the dimensions, shape, and configuration of different aircraft may require different oblique seating arrangements in terms of seat pitch, seat angle, furniture angles, component dimensions, furniture position, etc., and each different arrangement may be served by the meal table solution described herein by adjusting a single dimension of the meal table. The meal table solution according to the present disclosure is configured to stow openly thereby remaining available for use as a table at all times, deploy to a use position, position in various different use positions to permit seat egress without having to stow the table, adjust vertically as desired, further deploy by unfolding to achieve an expanded condition, and adjust fore and aft along a seat/passenger centerline when deployed, among other features, aspects, and advantages. In some embodiments, the table height may be fixed. In other embodiments, the table height may be adjustable, for instance deploying from a higher position to a lower position or vice versa.

Figure 2:
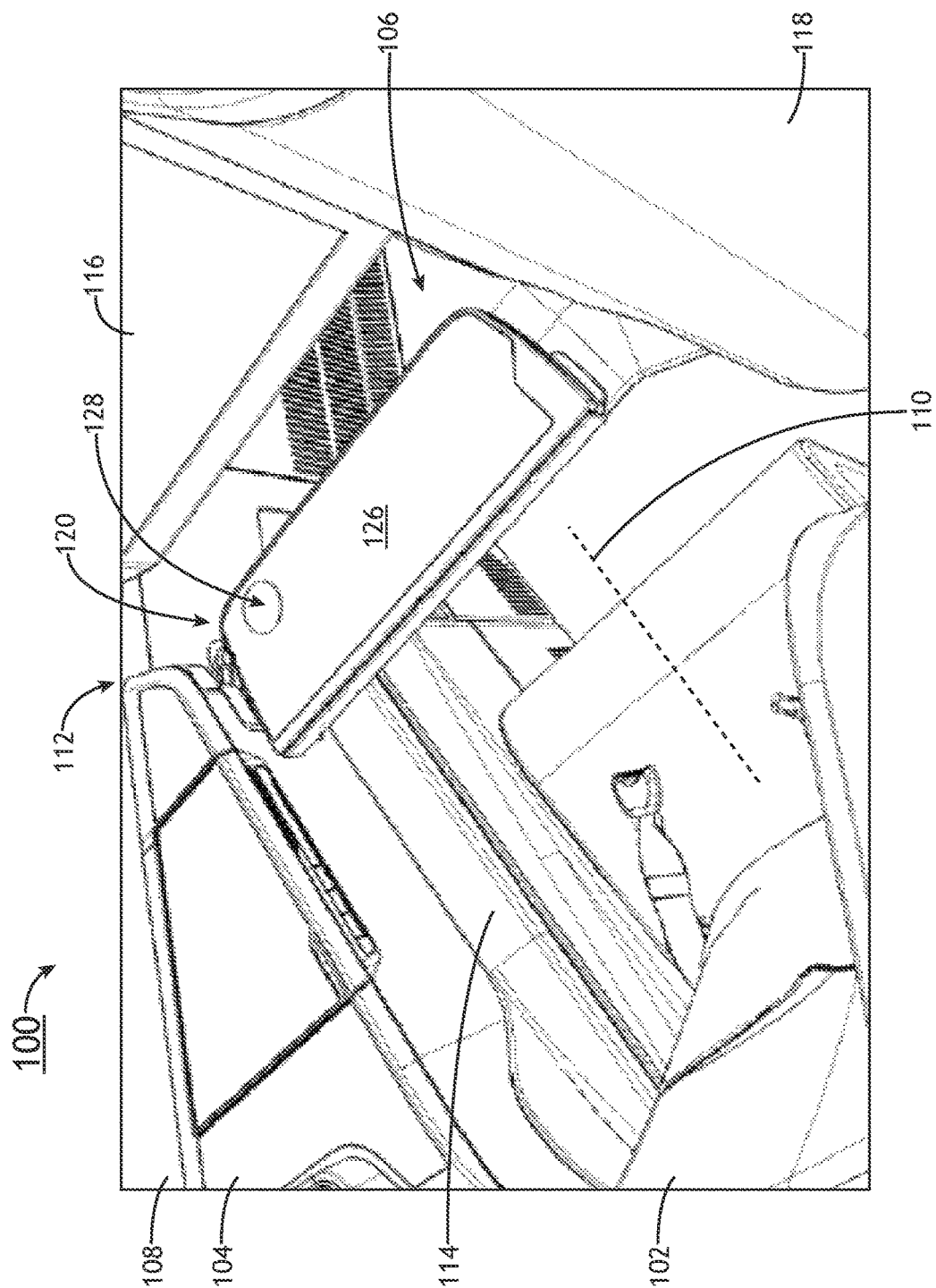
FIG. 2 is a perspective view of the passenger seating arrangement of FIG. 1 showing the meal table in a deployed position.
Figure 3:
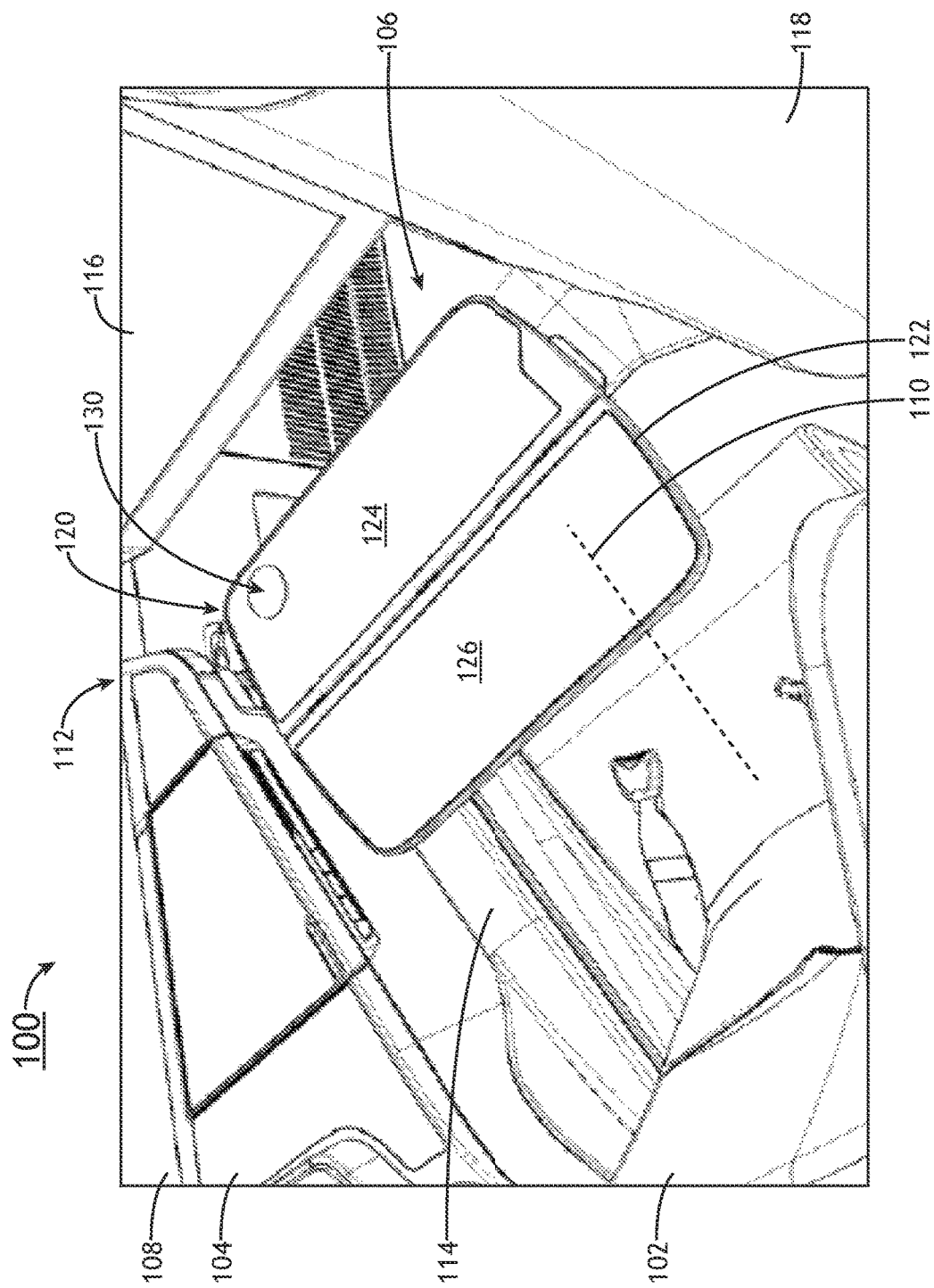
FIG. 3 is a perspective view of the passenger seating arrangement of FIG. 1 showing the meal table in an expanded condition.

Referring to FIGS. 1-3, a non-limiting example of an oblique seating arrangement is shown generally at 100. The seating arrangement 100 generally includes a passenger seat 102, a console 104 positioned to one side of the passenger seat, and a footwell 106 positioned forward of the passenger seat and spaced apart from a forward end of the console. The passenger seat 102 may be configured to adjust between an upright sitting position and a reclined sitting or sleeping position. In some embodiments, the passenger seat 102 may adjust from upright to lie flat forming a substantially horizontal bed. The passenger seat 102 may be equipped with a leg rest that adjusts, for instance rotating from substantially vertical to substantially horizontal, to form a portion of the substantially horizontal bed. In some embodiments, an ottoman may be positioned in the footwell and the passenger seat configured to adjust to meet to the ottoman to form the horizontal bed. For example, the seat pan may translate forward or the leg rest may rotate to horizontal. Seat adjustments may be accomplished via conventional actuators capable of linear and/or rotational motions.

The passenger seat 102 is oblique in that the passenger seat is angled relative to the aircraft longitudinal axis. As shown, the passenger seat 102 is angled toward the fuselage wall 108 and therefore also angled away from a nearest longitudinal aisle such as a longitudinal aisle parallel to the aircraft longitudinal axis. Although not shown, the seating arrangement 100 may be positioned along a longitudinal aircraft aisle such that the passenger seat is accessed directly from the longitudinal aisle or from a branch aisle leading from the longitudinal aisle. In some embodiments, the seat angle, measured from the seat centerline 110, is oblique. The term "oblique" as used herein may mean a seat angle between 18 degrees and 45 degrees relative to the aircraft longitudinal axis. In a particular embodiment, the oblique seat angle may be approximately 30 degrees. Oblique seats may be positioned generally forward facing and toward the aisle, generally forward facing and toward the fuselage wall, generally rearward facing and toward the aisle, generally rearward facing and toward the fuselage, forward facing toward another seat, and rearward facing toward another seat, among other positions and facing directions. In some embodiments, the seating arrangement includes a plurality of oblique seats positioned in various facing directions, at various angles relative to the aircraft longitudinal axis and other oblique seats, and in different nested configurations.

The console 104 as shown is positioned between the passenger seat 102 and the fuselage wall 108. Considering the passenger seat 102 is angled toward the fuselage wall 108, the console has a generally triangular shape that fills the space between the passenger seat 102 and the fuselage wall 108. The console 104 has a wide aft end and tapers in a direction of the forward end 112. The console top may provide a working surface, access to internal storage, locate a wireless charger, etc. The passenger seat 102 may be equipped with an armrest 114 or the armrest may be formed along one side of the console 104. The forward end 112 of the console 104 is spaced apart from the entrance into the footwell 106 to provide a space for positioning the stowed meal table as discussed below.

The footwell 106 may be positioned below a generally horizontal surface defining the ceiling of the footwell, for instance a desk, table, or other furniture. As shown, the footwell 106 is formed under a portion of a forward positioned like console and a monitor 116 is positioned above the entrance into the footwell. In some embodiments, the monitor 116 serves to separate longitudinally adjacent oblique seating arrangements and a wall 118 positioned opposite the console 104 further serves to separate the adjacent seating arrangements. In some embodiments, the wall 118 curves around the backside of a forward passenger seat. In some embodiments, the wall 118 may be straight or portions of the wall may be straight. The passenger cabin may include repeating units of like oblique seats wherein each console 104 functions as a console for one seat and a footwell for an adjacent seat.

The seating arrangement 100 further includes a meal table assembly 120. FIG. 1 shows the meal table assembly in a stowed position, also referred to herein as a "stowed condition" of the meal table. FIG. 2 shows the meal table assembly in a deployed position, also referred to herein as a "deployed condition" of the meal table. FIG. 3 shows the meal table assembly in a fully deployed position, also referred to herein as an "expanded condition."

When in the stowed position shown in FIG. 1, the meal table assembly 120 is positioned against the fuselage wall 108. In embodiments in which the console 104 is positioned along an interior wall, seat divider or another seat, the meal table assembly 120 may be positioned against the same wall as the console. As shown, a first portion of the meal table assembly, for example about one-half of the table, is positioned in the space between the forward end 112 of the console 104 and the entrance into the footwell 106. A second portion of the meal table assembly 120, for example about one-half of the table, is positioned inside the footwell 106, such as against or proximate the ceiling of the footwell. As such, when the meal table assembly 120 is in the stowed position, a portion of the meal table remains available for use. Thus, at least a portion of the meal table assembly is available for use at all times. In some embodiments, when the meal table is stowed, the tabletop elevation may be such that there is space between the top of the tabletop and a ceiling of the footwell to allow space for food and beverage items or other items to remain on the tabletop.

When in the deployed position shown in FIG. 2, the meal table assembly 120 is positioned directly forward of the passenger seat 102, for example with the longitudinal axis of the table perpendicular to the seat centerline. As discussed below, the meal table assembly 120 is configured to rotate between the stowed and deployed positions through various intermediate positions selectable by the passenger. The rotation angle may be determined based on the seat and the fuselage wall angles. For example, the meal table assembly 120 may rotate about 90 degrees or less, more preferably about 60 degrees or less, depending on the wall and seat angles. When in the deployed position with the table folded, the meal table assembly 120 is spaced apart from the passenger seat 102 to allow seat ingress and egress. Seat ingress and egress may be further enhanced by positioning the meal table assembly 120 in the stowed position or in an intermediate position between stowed and deployed.

When in the expanded condition shown in FIG. 3, the table is unfolded thereby expanding the table surface area and positioning the table closer to the passenger seat 102, for example in an over-seat position. The meal table assembly 120 generally includes a support arm (discussed further below) and a bi-fold table 122 attached to the support arm and including first and second tables 124, 126. In some embodiments, the second table 126 is hinged to the first table 124 such that the second table may be folded onto the first table to decrease the table size and unfold from the first table to increase the table size. In some embodiments, the first and second tables 124, 126 are about equally sized such that expanding the table doubles the surface area as compared to the folded condition. When unfolded, the first and second tables 124, 126 form a generally continuous horizontal surface. Other mechanisms and couplings for achieving an expandable table are envisioned.

As shown in FIGS. 1 and 2, a first beverage holder 128 is formed or otherwise provided in a bottom surface of the second table 126 such that the first beverage holder is available for use when the meal table assembly 120 is in the stowed and deployed positions and therebetween. As shown in FIG. 3, a second beverage holder 130 is formed or otherwise provided in a top surface of the first table 124 such that the second beverage holder is available for use when the meal table assembly 120 is in the expanded condition. Thus, considering the placement of the first and second beverage holders 128, 130 on opposite sides of the respective second and first tables 126, 124, one and only one beverage holder is available for use at all times. Beverage holders may be formed depressions, raised features, integrally formed with tables, or separate attached structures.

Figure 4:
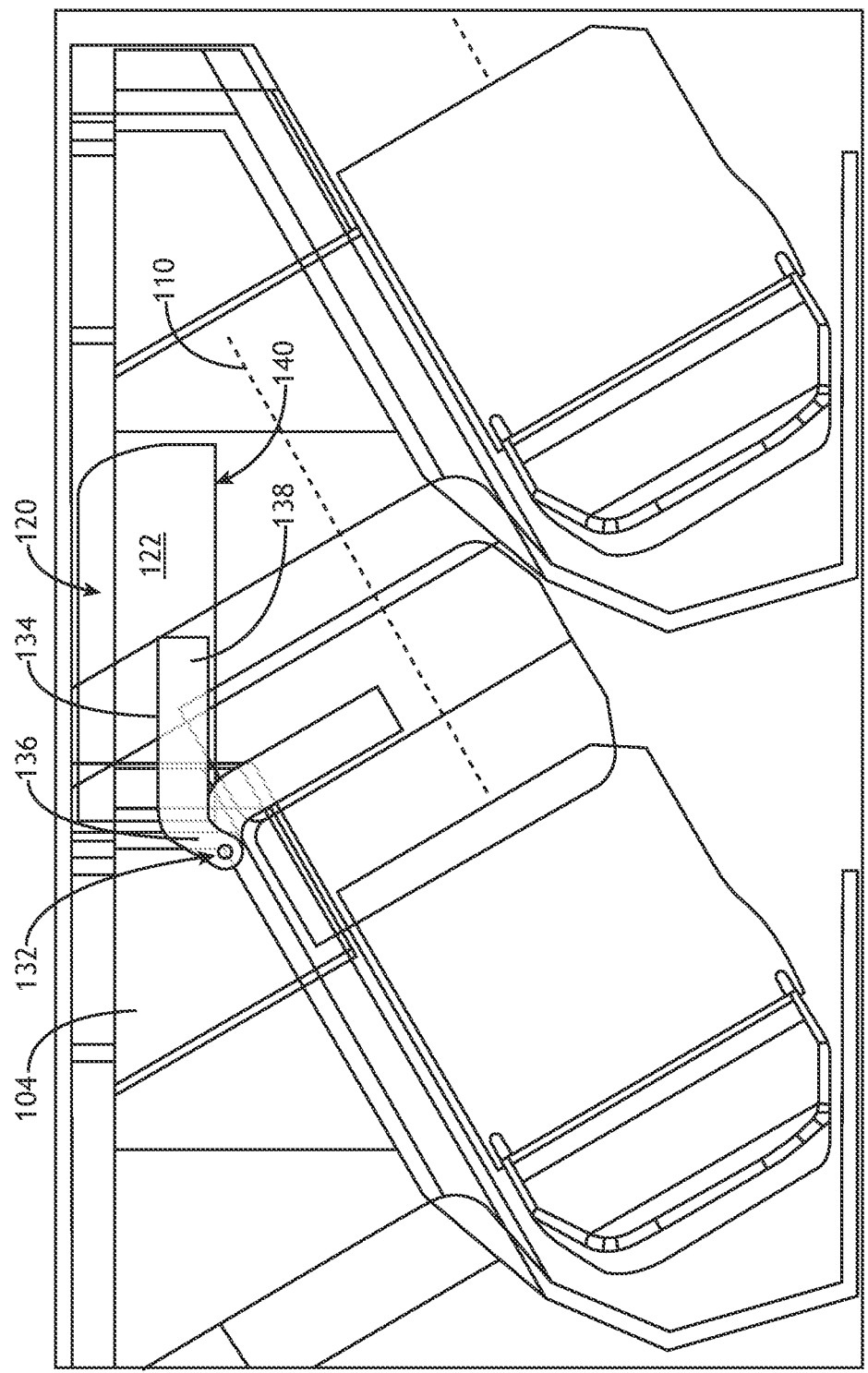
FIG. 4 is a top plan view illustrating a meal table assembly for installation in an oblique seating arrangement in a first aircraft cabin.
Figure 5:
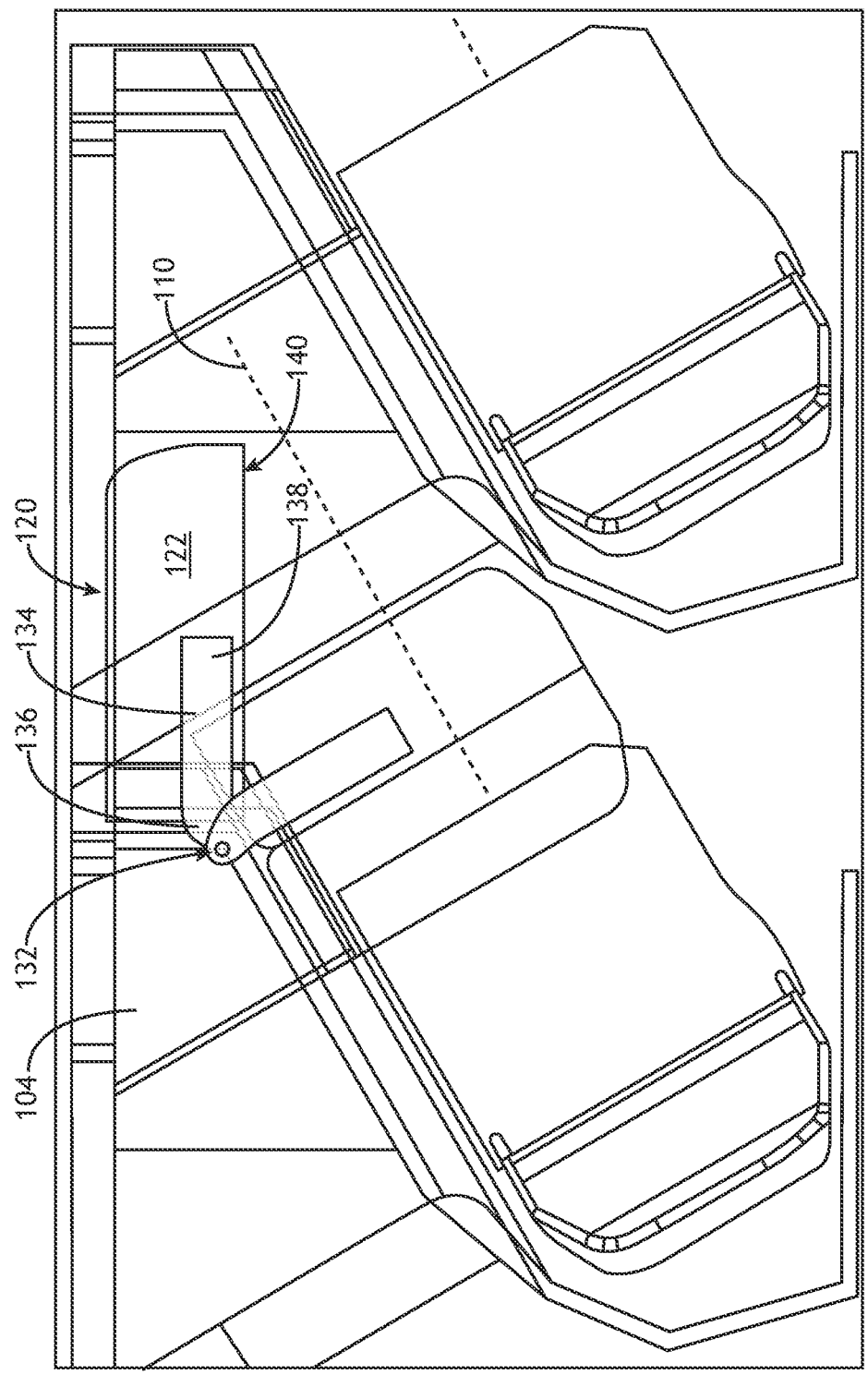
FIG. 5 is a top plan view illustrating a meal table assembly for installation in an oblique seating arrangement in a second aircraft cabin different from the first aircraft cabin.
Figure 6:
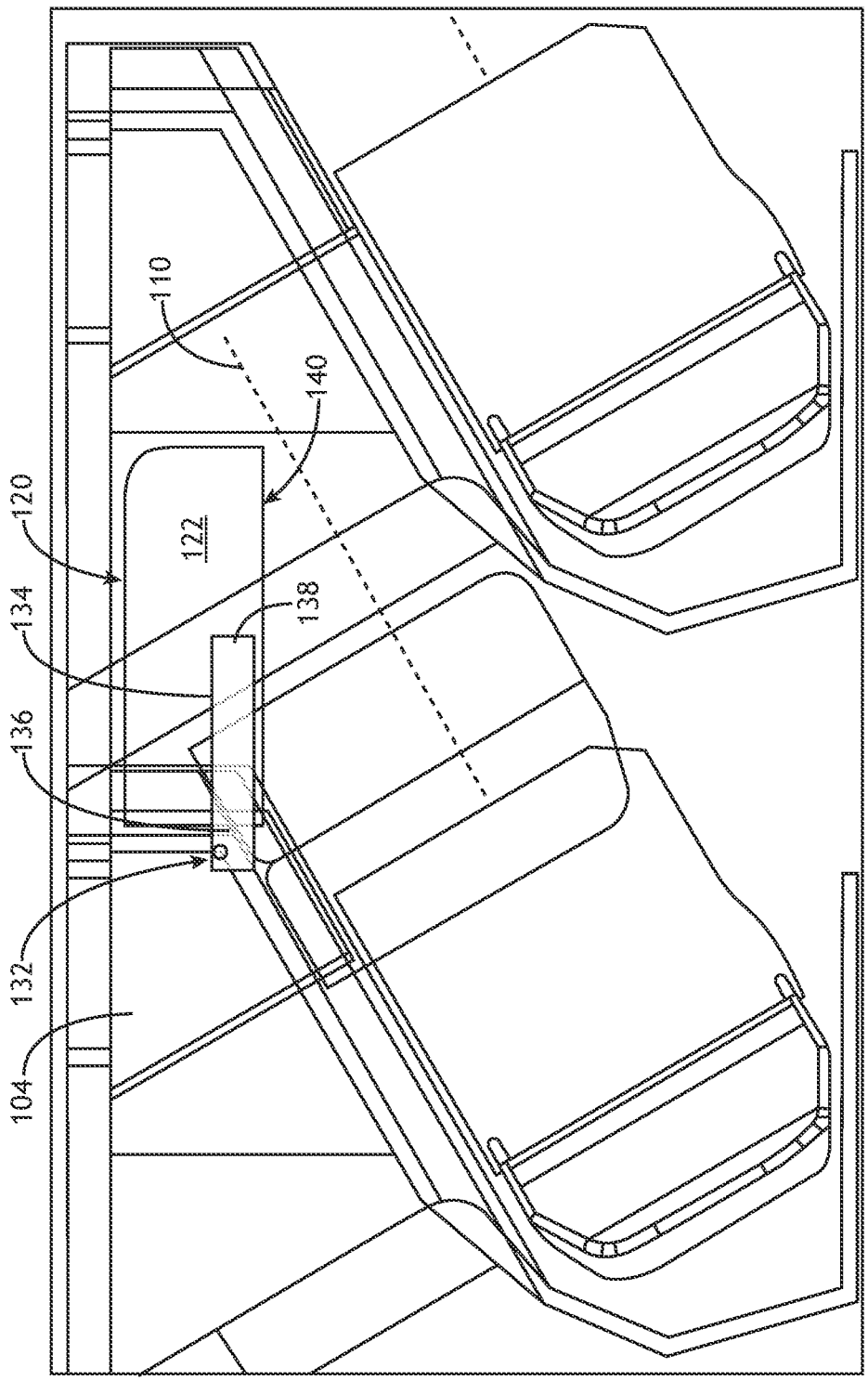
FIG. 6 is a top plan view illustrating a meal table assembly for installation in an oblique seating arrangement in a third aircraft cabin different from the first and second aircraft cabins.

Referring to FIGS. 4-6, different aircraft are shown each requiring a different oblique seat installation and adapted meal table assembly. FIG. 4 shows a first aircraft cabin configuration that allows the meal table assembly 120 to be stowed in a first position relative to the console 104. FIG. 5 shows a second aircraft cabin configuration that allows the meal table assembly 120 to be stowed in a second position relative to the console 104. FIG. 6 shows a third aircraft cabin configuration that allows the meal table assembly 120 to be stowed in a third position relative to the console 104.

In each installation, the pivot of the meal table assembly is indicated at 132. The pivot 132 is positioned proximate the forward end 112 of the console 104. The meal table assembly 120 includes a support arm 134 having one end pivotally attached to the console 104. The support arm 134 is elongated and extends from the console. The support arm 134 includes a first portion 136 including the pivot 132 and a second portion 138 angled relative to the first portion. The second portion 138 is elongated, supports the bi-fold table 122, and extends along a portion of the length of the bi-fold table 122. The support arm 134 rotates about a vertical axis to move the meal table assembly 120 between the stowed and deployed positions through intermediate positions.

Comparing FIGS. 4-6, in FIG. 4 the table pivot 132 is offset in a first direction relative to the leading edge 140 (i.e., nearest the passenger) of the bi-fold table 122 to position the table, when in the stowed position, farther from the seat centerline 110. In FIG. 5, the table pivot 132 is substantially aligned with the leading edge 140 to position the bi-fold table 122, when in the stowed position, nearer to the seat centerline 110 as compared to the configuration shown in FIG. 4. In FIG. 6, the table pivot 132 is offset in a second direction, opposite the first direction in FIG. 4, to position the bi-fold table 122, when in the stowed position, nearest to the seat centerline 110 as compared to the configurations shown in FIGS. 4 and 5. Thus, the meal table assembly 120 is readily adaptable to different aircraft and their respective oblique seat installations by adjusting a single dimension of the meal table assembly 120, i.e., the offset of the leading table edge 140 relative to the meal table pivot 132. This dimension may be adjusted, for example, by adjusting the length of the first support arm portion 136. Thus, the console 104 and meal table pivot 132 may remain constant between the different aircraft while the support arm geometry is adjusted to determine the bi-fold table position relative to the surrounding components.

Figure 7:
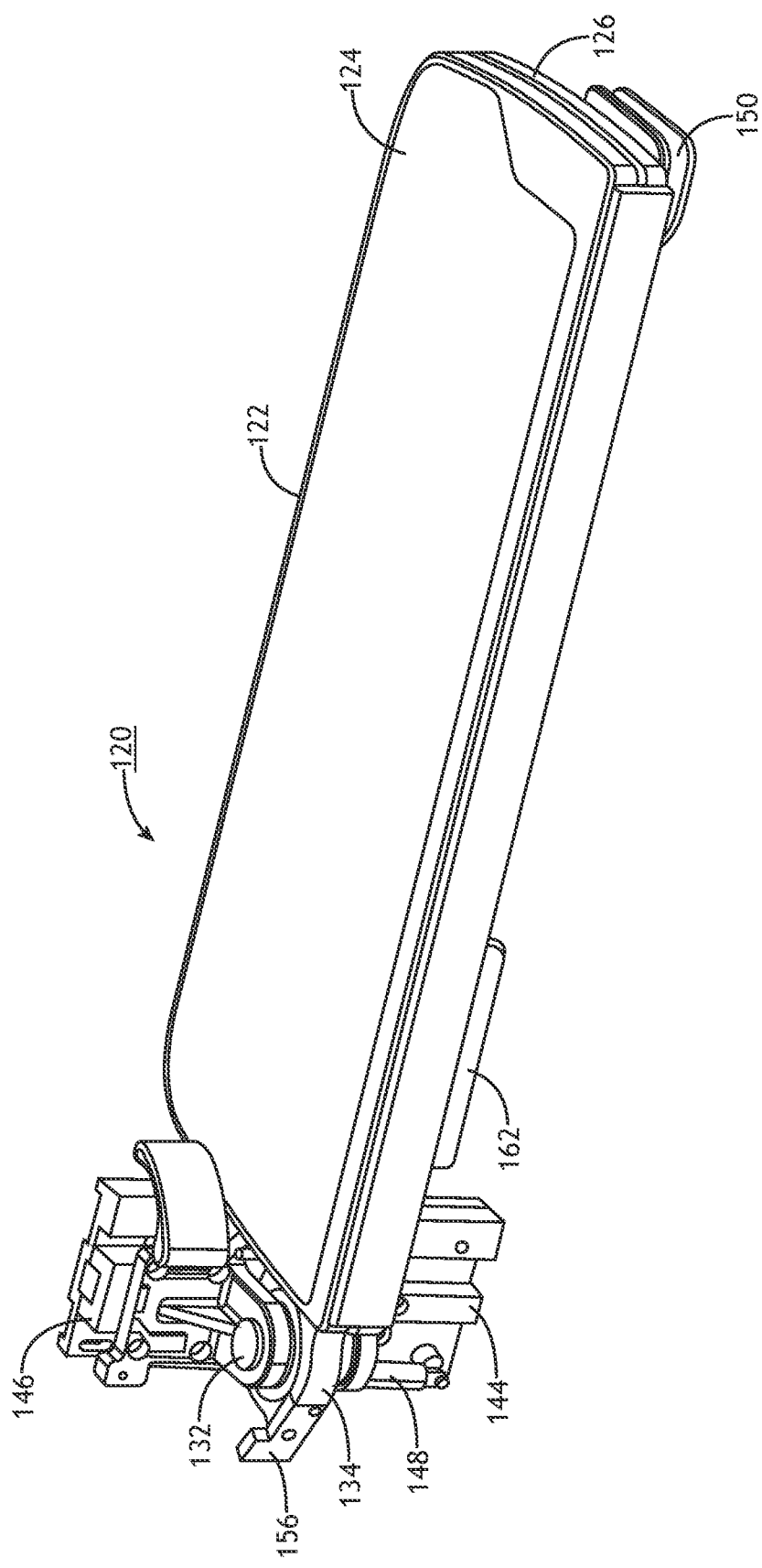
FIG. 7 is a top perspective view of a meal table assembly according to an embodiment of the present disclosure.
Figure 8:
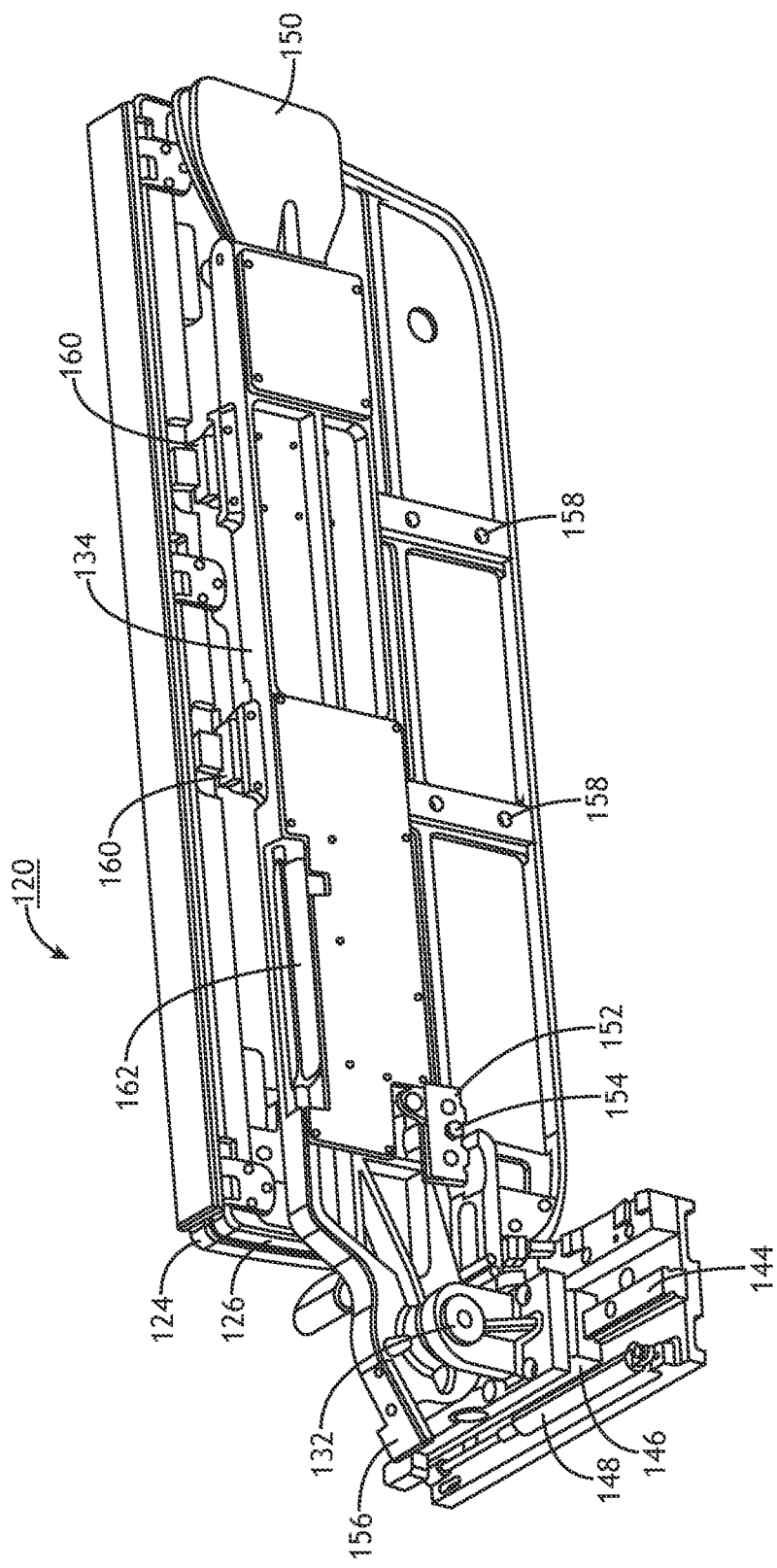
FIG. 8 is a bottom perspective view of the meal table assembly of FIG. 7.

FIGS. 7 and 8 show a meal table assembly 120 according to the present disclosure. The meal table assembly 120 generally includes the support arm 134 and the bi-fold table 122 attached to the support arm. As shown, the second table 126 is slidably attached to the support arm 134 and the first table 124 is hingedly attached to the second table 126 to permit the first table 124 to be folded and unfolded relative to the second table 126. The support arm 134 rotates about a meal table pivot 132, for example, positioned proximate the forward end of the console.

In some embodiments, the assembly 120 includes a vertical rail 144 associated with the pivotally attached end of the support arm and configured to provide vertical adjustment capability of the support arm 134 and consequently to the bi-fold table. The support arm 134 may be coupled to a carriage 146 slidable up and down along the vertical rail 144. A counterbalance 148 may be included to provide lift assistance to help raise the support arm 134. A primary up/down release lever 150, for instance a paddle, presented at the far end of the assembly is pulled to actuate a cable to release the carriage 146 from the vertical rail 144 to permit movement of the carriage along the rail for vertical adjustment. In use, when the counterbalance 148 is implemented as a gas spring, when the primary release lever 150 is actuated the internal gas pressure may raise the table or partially compensate for the weight of the table. The gas spring may also be substituted for a mechanical spring or other device to provide the lift assistance. In some embodiments, the vertical position of the meal table assembly 120 may be different in the stowed position as compared to the deployed position. For example, stowing the meal table assembly 120 may require first lowering the assembly before rotating the assembly to the stowed position.

As shown in FIG. 8, a stowage latch 152 positioned on the support arm 134 may engage with a catch 154 positionable on the console to maintain the meal table assembly 120 in the stowed position. For example, the latch 152 may deflect open to receive the catch 154. A mechanical stop 156 provided on the support arm 134 may engage a feature on the console to limit rotation of the support arm. In some embodiments, a magnetic detent may be provided at a predetermined rotation angle to stop the support arm rotation. The first table 124 may be folded and unfolded manually. In some embodiments, the catch and latch arrangement may be integrated into the pivot.

Fore/aft linear rail slides 158 provided on the bottom of the second table 126 engage support arm features 160 to provide fore/aft table adjustment. In use, the second table 126 may frictionally engage the linear rail slides 158 to stably maintain the table in different positions along the length of the linear rail slides. A second lever 162 presented along the leading edge of the bi-fold table may function as a rotate deploy handle and lever. In use, the second lever 162 releases the support arm 134 allowing the table to rotate from the stowed position to the deployed position.

Although the disclosure has been described with reference to the embodiments illustrated in the attached drawing figures, equivalents may be employed and substitutions made herein without departing from the scope of the claims. Components illustrated and described herein are merely examples of a system/device and components that may be used to implement embodiments of the disclosure and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A seating arrangement for an aircraft passenger cabin, comprising:
   a passenger seat positioned at an oblique angle relative to an aircraft longitudinal axis;
   a console positioned to one side of the passenger seat, the console tapering in a direction of a forward end of the console;

a footwell positioned forward of the passenger seat and spaced apart from the forward end of the console; and a meal table assembly including a support arm and a meal table attached to the support arm; wherein:

the support arm is pivotally attached to the console proximate the forward end of the console;

the support arm extends from the console; and the support arm is configured to rotate the meal table between a stowed position of the meal table in which a first portion of the meal table is positioned within the footwell and a second portion of the meal table is positioned in a space formed between the footwell and the forward end of the console, and a deployed position of the meal table in which each of the first and second portions of the meal table are positioned outside of the footwell.

2. The seating arrangement according to claim 1, wherein, when in the deployed position of the meal table or an expanded condition of the meal table, the support arm is repositionable along a vertical guide rail to adjust a vertical position of the meal table.

3. The seating arrangement according to claim 1, wherein the console is not attached to or shared with any other passenger seat positioned in the aircraft cabin.

4. The seating arrangement according to claim 1, wherein:

the meal table is a bi-fold table including a first table hinged to a second table;

in the stowed position of the meal table, the first and second tables are positioned vertically adjacent;

in the deployed position of the meal table, the first and second tables are positioned vertically adjacent; and in an expanded condition of the meal table, the first and second tables are positioned horizontally adjacent.

5. The seating arrangement according to claim 4, wherein:

each of the first and second tables includes a beverage holder;

the beverage holder of the second table is available for use only when the meal table is positioned in the stowed position or the deployed position of the meal table; and the beverage holder of the first table is available for use only when the meal table is in the expanded condition of the meal table.

6. The seating arrangement according to claim 1, wherein:

the support arm includes a first portion and a second portion;

the first portion is pivotally attached to the console; and the second portion is angled relative to the first portion.

7. The seating arrangement according to claim 6, wherein changing a length of the first portion repositions the second portion relative to a vertical pivot axis of the meal table.

8. The seating arrangement according to claim 1, wherein, in the deployed position of the meal table or an expanded condition of the meal table, the meal table is slidable fore and aft relative to the support arm to reposition the meal table relative to the passenger seat.

9. A seating arrangement configured to be positioned in an aircraft cabin, the seating arrangement comprising:

a passenger seat positioned at an oblique angle relative to an aircraft longitudinal axis and facing a fuselage wall;

a console positioned to an outboard side of the passenger seat, the console tapering in a direction of a forward end of the console, and the console configured to be positioned along the fuselage wall;

a footwell positioned forward of the passenger seat and spaced apart from the forward end of the console; and a meal table assembly including a support arm and a meal table attached to the support arm; wherein:

the support arm is pivotally attached to the console proximate the forward end of the console;

the support arm extends from the console; and the support arm is configured to rotate the meal table between a stowed position of the meal table in which a first portion of the meal table is positioned within the footwell and a second portion of the meal table is positioned in a space formed between the footwell and the forward end of the console, and a deployed position of the meal table in which each of the first and second portions of the meal table are positioned outside of the footwell.

10. The seating arrangement according to claim 9, wherein the console is not attached to or shared with any other passenger seat positioned in the aircraft cabin.

11. The seating arrangement according to claim 9, wherein:

the meal table is a bi-fold table including a first table hinged to a second table;

in the stowed position of the meal table, the first and second tables are positioned vertically adjacent;

in the deployed position of the meal table, the first and second tables are positioned vertically adjacent; and in an expanded condition of the meal table, the first and second tables are positioned horizontally adjacent.

12. The seating arrangement according to claim 11, wherein:

each of the first and second tables includes a beverage holder;

the beverage holder of the second table is available for use when the meal table is positioned in the stowed position or the deployed position of the meal table; and the beverage holder of the first table is available for use when the meal table is in the expanded condition of the meal table.

13. The seating arrangement according to claim 9, wherein:

the support arm includes a first portion and a second portion;

the first portion is pivotally attached to the console; and the second portion is angled relative to the first portion.

14. The seating arrangement according to claim 13, wherein changing a length of the first portion repositions the second portion relative to a vertical pivot axis of the meal table.

15. The seating arrangement according to claim 9, wherein, in the deployed position of the meal table or an expanded condition of the meal table, the meal table is slidable fore and aft relative to the support arm to reposition the meal table relative to the passenger seat.

16. The seating arrangement according to claim 9, wherein, when in the deployed position of the meal table or an expanded condition of the meal table, the support arm is repositionable along a vertical guide rail to adjust a vertical position of the meal table.

\* \* \* \* \*